(12) United States Patent
Okada

(10) Patent No.: US 10,718,691 B2
(45) Date of Patent: Jul. 21, 2020

(54) TIRE AIR FILLING MECHANISM AND TIRE AIR FILLING METHOD FOR TIRE TESTING DEVICE

(71) Applicant: KOBE STEEL, LTD., Hyogo (JP)

(72) Inventor: Toru Okada, Hyogo (JP)

(73) Assignee: KOBE STEEL, LTD., Hyogo (JP)

( * ) Notice: Subject to any disclaimer, the term of this patent is extended or adjusted under 35 U.S.C. 154(b) by 82 days.

(21) Appl. No.: 16/074,221

(22) PCT Filed: Jan. 24, 2017

(86) PCT No.: PCT/JP2017/002262
§ 371 (c)(1),
(2) Date: Jul. 31, 2018

(87) PCT Pub. No.: WO2017/135100
PCT Pub. Date: Aug. 10, 2017

(65) Prior Publication Data
US 2020/0041384 A1    Feb. 6, 2020

(30) Foreign Application Priority Data
Feb. 3, 2016    (JP) .................. 2016-019167

(51) Int. Cl.
*B60C 23/00*    (2006.01)
*B60C 23/02*    (2006.01)
(Continued)

(52) U.S. Cl.
CPC ........... *G01M 17/02* (2013.01); *B60C 23/003* (2013.01); *B60C 25/145* (2013.01)

(58) Field of Classification Search
CPC .. G01M 17/02; G01M 17/021; G01M 17/022; G01M 17/027; G01M 17/025; G01M 17/024; G01M 17/10; G01M 7/08; G01M 17/0076; G01M 17/013; G01M 17/03; G01M 17/04; G01M 17/06;
(Continued)

(56) References Cited

U.S. PATENT DOCUMENTS 4,702,287 A    10/1987  Higbie et al.
5,291,776 A    3/1994   Mallison
(Continued)

FOREIGN PATENT DOCUMENTS

CN    101832867        9/2010
CN    104458286 A      3/2015
(Continued)

OTHER PUBLICATIONS

International Search Report issued in PCT/JP2017/002262; dated Mar. 7, 2017.
Written Opinion issued in PCT/JP2017/002262; dated Mar. 7, 2017.

*Primary Examiner* — Andre J Allen
(74) *Attorney, Agent, or Firm* — Studebaker & Brackett PC

(57) ABSTRACT

A tire air filling mechanism in a tire testing device includes an air supply source which supplies air into a tire to be mounted between a pair of rims attached to ends of tire shafts. An injection direction of the air supplied into the tire from the air supply source is set at a direction inclined with respect to a radial direction of the tire, so that the air supplied from the air supply source can be turned inside the tire.

6 Claims, 7 Drawing Sheets

(51) Int. Cl.
G01M 17/02 (2006.01)
B60C 25/14 (2006.01)

(58) Field of Classification Search
CPC ........ G01M 17/08; G01M 1/02; G01M 1/045;
G01M 1/12; G01M 1/225; G01M 3/40;
G01M 5/0091; G01M 7/02; G01M 99/00;
G01M 99/002; B60C 23/0494; B60C
2019/004; B60C 23/0493; B60C 19/00;
B60C 23/04; B60C 23/0498; B60C
23/064; B60C 23/0488; B60C 23/0496;
B60C 23/0408; B60C 23/041; B60C
23/0411; B60C 23/20; B60C 23/0486;
B60C 23/06; B60C 11/243; B60C 11/246;
B60C 23/061; B60C 99/00; B60C
11/0083; B60C 13/003; B60C 2009/2038;
B60C 23/00; B60C 23/003; B60C 23/004;
B60C 23/02; B60C 23/0401; B60C
23/0406; B60C 23/0416; B60C 23/0433;
B60C 23/0455; B60C 23/0459; B60C
23/0474; B60C 23/0489; B60C 23/0491;
B60C 25/002; B60C 25/005; B60C
25/007; B60C 29/02; B60C 3/04; B60C
99/006; B60C 11/0332; B60C 11/24;
B60C 13/001; B60C 13/02; B60C
15/0036; B60C 17/02; B60C 2009/0071;
B60C 2009/2022; B60C 2200/02; B60C
2200/06; B60C 2200/065; B60C 23/001;
B60C 23/007; B60C 23/008; B60C
23/0413; B60C 23/0427; B60C 23/0447;
B60C 23/0454; B60C 23/0457; B60C
23/0462; B60C 23/0467; B60C 23/0471;
B60C 23/0472; B60C 23/0476; B60C
23/0479; B60C 23/0484; B60C 23/065;
B60C 23/066; B60C 23/10; B60C
25/0548; B60C 25/056; B60C 25/132;
B60C 25/138; B60C 25/18; B60C 29/005;
B60C 9/005; B60C 9/18; B60C 9/1807;
B60C 9/20; B60C 9/28

USPC .................................................. 73/146–146.8
See application file for complete search history.

(56) References Cited

U.S. PATENT DOCUMENTS

| | | | |
|---|---|---|---|
| 2004/0000364 A1* | 1/2004 | Hennig | B60C 23/003 152/417 |
| 2005/0194079 A1* | 9/2005 | Hennig | B60C 23/003 152/417 |
| 2007/0220964 A1 | 9/2007 | Shinomoto et al. | |
| 2011/0203362 A1 | 8/2011 | Imamura et al. | |
| 2012/0318422 A1* | 12/2012 | Lloyd | B60C 23/003 152/417 |
| 2013/0167975 A1* | 7/2013 | Tigges | B60C 23/003 141/285 |
| 2013/0199685 A1* | 8/2013 | Nelson | B60B 37/00 152/415 |
| 2014/0345768 A1* | 11/2014 | Hrabal | B60C 23/004 152/419 |
| 2014/0363271 A1* | 12/2014 | Wagemann | B60C 23/003 415/13 |
| 2016/0214441 A1* | 7/2016 | Hoeldrich | B60C 23/02 |
| 2017/0129293 A1* | 5/2017 | Knapke | B60C 23/003 |
| 2017/0246921 A1* | 8/2017 | Hoeldrich | B60C 23/0474 |
| 2018/0087681 A1* | 3/2018 | Ehrlich | B60C 23/0406 |
| 2019/0009622 A1* | 1/2019 | Buhrke | B60B 27/02 |
| 2019/0193491 A1* | 6/2019 | Cheng | B60C 23/447 |
| 2019/0329602 A1* | 10/2019 | Pouls | B60C 23/003 |

FOREIGN PATENT DOCUMENTS

| | | | |
|---|---|---|---|
| GB | 201315391 | * 10/2013 | ........ B60C 23/003 |
| JP | H01-310914 A | 12/1989 | |
| JP | H06-095057 B2 | 11/1994 | |
| JP | 2003-326610 A | 11/2003 | |
| JP | 2008-137286 A | 6/2008 | |
| JP | 2011-069772 A | 4/2011 | |
| JP | 2013-121684 A | 6/2013 | |

* cited by examiner

TIRE AIR FILLING MECHANISM AND TIRE AIR FILLING METHOD FOR TIRE TESTING DEVICE

TECHNICAL FIELD

The present invention relates to a technique for supplying air to a tire for use in a tire testing device such as a tire uniformity machine to thereby inflate the tire.

BACKGROUND ART

Tire testing (tire uniformity testing) has been hitherto carried out. In the tire testing, tire uniformity or the like is measured on a tire finished as a product to thereby determine the quality of the tire. For example, when tire uniformity is measured on a tire for a passenger car, the tire testing is generally performed in the following procedure using a tire testing device as shown in Patent Literature 1.

That is, the tire testing device in Patent Literature 1 has an air pressure circuit. In the air pressure circuit, compressed air which has been supplied from a factory air source (air supply source) and whose pressure has been adjusted is supplied to a tire seated on a rim. The tire is inflated by the air pressure circuit, and tire uniformity testing is then performed thereon. The air pressure circuit has two systems of pipe arrangements branching halfway. One is a pipe arrangement of a bead seat system for inflating the tire in a short time to mount the time on the rim, and the other is a pipe arrangement of a test system to be used for testing the tire. The pipe arrangement of the bead seat system and the pipe arrangement of the test system are changed over using a changeover valve. Thus, the air pressure circuit can inflate the tire through paths of the pipe arrangements of the two systems.

When the tire testing is performed by the tire testing device, the tire having flowed from the upstream side of a testing line is first held by the rim which is divided into upper and lower parts. Next, the tire is inflated in a short time using the pipe arrangement of the bead seat system. On this occasion, the air pressure of compressed air supplied to the tire using the pipe arrangement of the bead seat system is generally set at a higher pressure (for example, about 400 kPa) than a test pressure (test air pressure) for the tire testing. The tire is kept at the test pressure for about one second including a pressure increase time.

Next, in the tire testing device, the flow path of the compressed air is changed over from the pipe arrangement of the bead seat system to the pipe arrangement of the test system using the changeover valve. A pressure adjustment valve is provided in the middle of the pipe arrangement of the test system so that the pressure of the high-pressure compressed air can be reduced to the test pressure (for example, about 200 kPa). Thus, when the compressed air is supplied through the pipe arrangement of the test system, the air pressure in the tire can be adjusted to the test pressure. Then, the tire kept at the test pressure is rotated, and pressed against a drum. Repulsion force generated in the tire is measured using a load measuring unit provided in the drum. Thus, the uniformity of the tire is measured.

A servo-type pressure regulator may be used as the aforementioned pressure adjustment valve as described in Patent Literature 2.

CITATION LIST

Patent Literature

Patent Literature 1: JP-B-6-95057
Patent Literature 2: U.S. Pat. No. 5,291,776
Patent Literature 3: JP-A-2011-69772

SUMMARY OF THE INVENTION

Problem that the Invention is to Solve

However, in the tire testing, it has been known that a measured result of the uniformity fluctuates largely even when the air pressure in a tire which is being tested fluctuates slightly. Therefore, in order to prevent a defective product from being shipped to the market or in order to prevent a non-defective product from being erroneously determined as a defective product, it is important to keep the air pressure in the tire constant at the test pressure. However, in actual tire testing, the air pressure may drop down during the testing or may occasionally rise.

Such a change of the air pressure in the tire may be small to be about 0.5 kPa in one case, or large to be about 1 kPa in another case. Even when the change of the air pressure is small to be about 0.5 kPa, the change of the air pressure in the tire has large influence on the measured result of uniformity. For the uniformity, a change in repulsion force of the tire during one rotation of the tire is measured. The uniformity is measured as a value in which a change in repulsion force caused by the change of the air pressure is added to the variation characteristic of the repulsion force derived from the tire itself. Even when using the same tire, a different measured result may be obtained on every testing because a phase relation where variation characteristics overlap with each other changes in accordance with the measuring timing. Thus, it is likely that stability in repeated use of a testing device cannot be surely determined, and there is a fear that it is difficult to secure the quality as a testing device or a testing line.

However, it is difficult to adjust such a very small change of air pressure by means of a general pressure adjustment valve as used in the tire testing device according to Patent Literature 1. The range of pressure which can be adjusted by the general pressure adjustment valve is about 1,000 kPa, and the pressure adjustment accuracy is at most ±0.1%, that is, about 1 kPa. Accordingly, the air pressure in the tire having a fluctuation of about 0.5 kPa during tire testing cannot be adjusted using the pressure adjustment valve having a pressure adjustment accuracy of about 1 kPa.

On the other hand, Patent Literature 2 discloses a servo-type pressure adjustment valve. The servo-type pressure adjustment valve is excellent in pressure adjustment accuracy, but is low in responsiveness and expensive in cost. Therefore, although the servo-type pressure adjustment valve can deal with a gentle and stationary fluctuation of air pressure, the servo-type pressure adjustment valve does not have responsiveness high enough to adjust the air pressure in the tire timely within a tire testing time of about only one second. In addition, when an expensive valve such as the servo-type pressure adjustment valve is used, there is a problem that the price of the tire testing device increases. Therefore, it is not realistic that the air pressure in the wire fluctuating during the tire testing is adjusted by the tire testing device using the servo-type pressure adjustment valve as disclosed in Patent Literature 2.

According to Patent Literature 3, it has been proved that influence of an air temperature drop inside a tire is one of factors for the pressure to decrease during tire testing. Here, decrease in pressure during the tire testing will be described in detail. When compressed air at normal temperature flows into a tire by a bead air pressure, the air originally existing in the tire is compressed so that the temperature rises due to adiabatic compression. Thus, the air in the tire reaches a high temperature. After that, in a process of moving from the bead air pressure to a test air pressure, the pressure in the tire decreases suddenly so that the temperature of the air in the tire decreases due to adiabatic expansion. However, the amount of the original temperature increase is so large that the final temperature of the air in the tire is higher than the temperature of the tire or a rim, which is a normal temperature. As a result, heat of the air in the tire is transmitted to the tire or the rim during the tire testing. Thus, the air temperature inside the tire decreases.

For example, when 0.05 m$^3$ of compressed air at 200 kPa is enclosed in a tire or a pipe arrangement, assume that the air temperature decreases by 1° C. from 25° C. to 24° C. for a measuring time of one second.

Here, on the assumption that the volume does not change so much, the pressure decreases by 200 kPa×1K/297K=0.7 kPa based on the Boyle-Charles' law (a value obtained by dividing a product of pressure and volume by absolute temperature is constant). In addition, it has been also known that, as the air temperature in the tire in the process of moving to the test air pressure is higher and higher than the temperature of the rim or the tire (outside air temperature), the change amount of the temperature during the measuring time increases so that the change amount of the pressure also increases.

Therefore, Patent Literature 3 proposes that initial high-pressure air in a bead seat system is cooled in advance so that the air temperature in a test air pressure can be decreased to a temperature around the outside air temperature. However, in order to cool the air temperature in every test cycle performed once per about 30 seconds, large-scale cooling equipment is required in an air supply source such as a tank. Thus, there is a problem that the manufacturing cost is increased on a large scale.

The present invention has been developed in consideration of the aforementioned problems. An object of the invention is to provide a tire air filling mechanism and a tire air filling method in a tire testing device, capable of suppressing a temperature rise in air inside the tire to thereby suppress fluctuation of air pressure generated during tire testing when the air is supplied to the tire, and capable of measuring uniformity of the tire at low cost and with high accuracy.

Means for Solving the Problem

In order to attain the aforementioned object, the following technical means are employed in a tire air filling mechanism and a tire air filling method in a tire testing device according to the present invention.

That is, a tire air filling mechanism in a tire testing device according to the invention includes an air supply source which supplies air into a tire to be mounted between a pair of rims attached to ends of tire shafts, wherein an injection direction of the air supplied into the tire from the air supply source is set at a direction inclined with respect to a radial direction of the tire, so that the air supplied from the air supply source can be turned inside the tire.

Preferably an air injection port from which the air supplied into the tire from the air supply source is injected may be formed in one of the tire shafts, and the air injection port may be formed in a direction inclined with respect to the radial direction.

Preferably a curved tube member may be provided so that the injection direction of the air injected in the radial direction from the air injection port can be changed to a direction inclined with respect to the radial direction.

Preferably a direction-changing plate may be provided so that the injection direction of the air injected in the radial direction from the air injection port can be changed to a direction inclined with respect to the radial direction.

On the other hand, a tire air filling method in a tire testing device according to the invention is characterized in that the aforementioned tire air filling mechanism is used to inject the air supplied from the air supply source in a direction inclined with respect to the radial direction so that the air can be supplied into the tire while being turned inside the tire.

Advantage of the Invention

According to a tire air filling mechanism and a tire air filling method in a tire testing device according to the present invention, when air is supplied to a tire, a temperature rise of the air inside the tire is suppressed to thereby suppress fluctuation of air pressure generated during tire testing, so that uniformity of the tire can be measured at low cost and with high accuracy.

MODE FOR CARRYING OUT THE INVENTION

First Embodiment

First, a tire testing device 2 provided with a tire air filling mechanism 1 according to the invention will be described below in detail with reference to the drawings.

Figure 1:
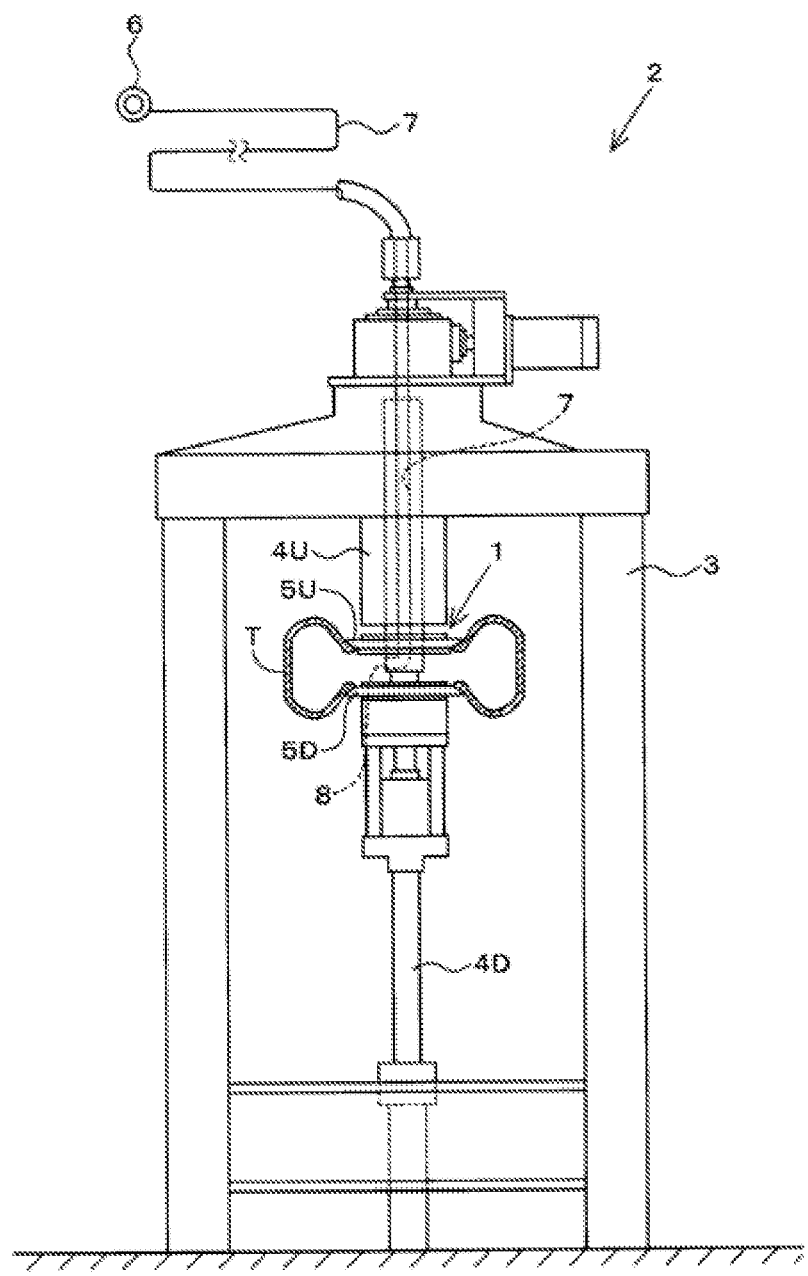
FIG. 1 is a view illustrating a tire testing device provided with a tire air filling mechanism according to a first embodiment.

FIG. 1 schematically illustrates the tire testing device 2 provided with the tire air filling mechanism 1 according to a first embodiment.

The tire testing device 2 is generally called a tire uniformity machine, which performs product testing such as tire uniformity on a tire T finished as a product. The tire testing device 2 has a configuration illustrated in FIG. 1 by way of example.

As schematically illustrated in FIG. 1, the tire testing device 2 includes a frame 3 provided on a floor like a tower, a pair of upper and lower tire shafts 4U and 4D attached to the frame 3, and a pair of upper and lower rims 5U and 5D provided on the tire shafts 4U and 4D so as to fix the tire T. The rims 5U and 5D are disposed rotatably around the tire shafts 4U and 4D facing in an up/down direction. Further, a drum (not shown) having a simulated road surface in its outer circumferential surface is provided laterally to the tire T fixed by the rims 5U and 5D. The drum can be rotationally driven around an axis facing in the up/down direction. The drum is also designed so that it can move horizontally to bring the simulated road surface into contact with the tire T.

In the following description, the up/down direction of the paper of FIG. 1 will be used as the up/down direction for describing the tire testing device 2.

The tire testing device 2 has, as tire shafts, the upper tire shaft 4U provided on the upper side of the frame 3, and the lower tire shaft 4D disposed coaxially with the upper tire shaft 4U and liftably provided on the lower side at a distance from the upper tire shaft 4U. The upper rim 5U is provided at a lower end of the upper tire shaft 4U, and the lower rim 5D is provided at an upper end of the lower tire shaft 4D. When the upper and lower tire shafts 4U and 4D are made close to each other, the tire T can be held between the upper and lower rims 5U and 5D to be thereby fixed.

In the upper and lower rims 5U and 5D or the drum, a load measuring unit or the like for measuring a force generated in the tire T which is running is provided so that tire uniformity of the tire T can be measured. In order to perform the aforementioned tire testing, it is necessary to adjust the tire T to have a predetermined air pressure. To this end, an air pressure circuit 9 (tire air filling mechanism 1) is provided to supply compressed air into the tire T or discharge the compressed air from the tire T to thereby adjust the air pressure in the tire T.

As illustrated in FIG. 1, the air pressure circuit 9 has a pipe arrangement going from an air supply source 6 into the tire T. The air pressure circuit 9 communicates with the inside of the tire T through air injection ports 8 which are open on the lower side of an air supply flow path 7 provided to penetrate the inside of the upper tire shaft 4U in the up/down direction. The air pressure circuit 9 can circulate the compressed air in the tire T through the air supply flow path 7 and the air injection ports 8.

Figure 2:
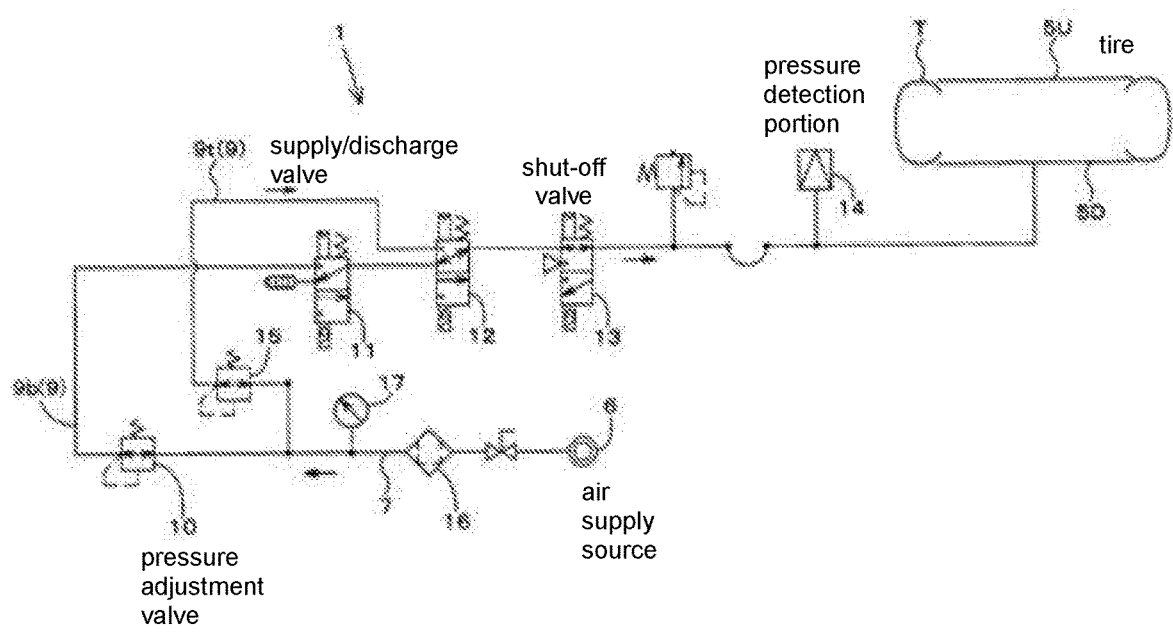
FIG. 2 is a diagram illustrating a configuration (circuit) of the tire air filling mechanism according to the first embodiment.

As illustrated in FIG. 2, the air pressure circuit 9 has a fundamental configuration in which the compressed air generated in the air supply source 6 is adjusted to have a predetermined air pressure, and supplied to the tire T. The air pressure circuit 9 has two systems of paths reaching the tire T. One of the two systems is a bead seat system 9b by which the tire T is inflated in a short time so that a bead of the tire T is pressed against the rims. The other is a test system 9t which is used for testing the tire T.

In the fundamental configuration diagram of the air pressure circuit 9 in FIG. 2, assume that the air supply source 6 side is regarded as upstream side for description of the air pressure circuit 9, and the tire T side is regarded as downstream side for description of the air pressure circuit 9. The upstream side and the downstream side coincide with the upstream side and the downstream side in the flow (arrow direction in FIG. 2) of compressed air when the compressed air is supplied into the tire T.

As for the pipe arrangements of the two systems, the compressed air circulated through the bead seat system 9b is adjusted to have an air pressure (bead air pressure) of about 400 kPa, and the compressed air circulated through the test system 9t is adjusted to have an air pressure (test air pressure) of about 200 kPa, which is lower than that in the bead seat system 9b. The bead seat system 9b and the test system 9t branch from the middle of the pipe arrangement going from the air supply source 6 to the tire T. After the air pressures in the two systems are adjusted to the aforementioned air pressures respectively, the two systems join each other in one pipe arrangement again.

Next description will be made in detail about the test system 9t and the bead seat system 9b.

The path of the test system 9t includes the air supply source 6, a pressure adjustment valve 10, a supply/discharge valve 11, a changeover valve 12, a shut-off valve 13, and a pressure detection portion 14 in order from the upstream side to the downstream side. On the other hand, the pipe arrangement path of the bead seat system 9b branches from the pipe arrangement of the test system on the downstream side of the air supply source 6. After the compressed air in the bead seat system 9b is adjusted to have the bead air pressure by the bead pressure adjustment valve 15, the bead seat system 9b joins the same pipe arrangement as the test system 9t through the changeover valve 12.

The air supply source 6 is a supply source of factory air pressurized by a not-shown compressor or the like. The air supply source 6 generates compressed air whose pressure is equivalent to or higher than the air pressure (bead air pressure) with which the tire T is inflated through the bead seat system 9b. An air filter 16 for capturing dust or the like flowing in from the air supply source 6 is provided on the downstream side of the air supply source 6. A pressure gauge 17 for checking the pressure of the compressed air generated in the air supply source is provided on the downstream side of the air filter 16. In the test system 9t, the pressure adjustment valve 10 is placed on the downstream side of the pressure gauge 17.

The pressure adjustment valve 10 (test pressure adjustment valve) is a pressure regulator by which the compressed air delivered from the air supply source 6 is adjusted to have a predetermined pressure. The pressure adjustment valve 10 is provided in the pipe arrangement of the test system 9 branching on the downstream side of the air supply source 6. A bead pressure adjustment valve 15 having a similar configuration to that of the test pressure adjustment valve 10 is provided in the pipe arrangement of the bead seat system 9b.

The pressure of the high-pressure compressed air generated in the air supply source 6 is reduced to a bead air pressure (for example, 400 kPa) by the bead pressure adjustment valve 15, and reduced to a test air pressure (for example, 200 kPa) by the test pressure adjustment valve 10.

The changeover valve 12 changes over the flow path of the compressed air between the test system 9t side and the bead seat system 9b side so as to change over the air pressure in the tire T between the bead air pressure and the test air pressure.

When the changeover valve 12 in the embodiment is in an ON-state, the compressed air adjusted to the bead air pressure can be supplied into the tire T through the pipe arrangement of the bead seat system 9b. When the changeover valve 12 is not operated (that is, when it is in an OFF-state), the compressed air adjusted to the test pressure can be supplied into the tire T through the pipe arrangement of the test system 9t.

The shut-off valve 13 is a direction control valve provided on the downstream side of the changeover valve 12. When the shut-off valve 13 is changed over to shut off the flow path of the compressed air, the compressed air can be enclosed within the pipe arrangement reaching the inside of the tire T on the downstream side of the shut-off valve 13.

The supply/discharge valve 11 is a direction control valve provided on the downstream side of the test pressure adjustment valve 10. The supply/discharge valve 11 is changed over to control the supply of the air into the tire T and the discharge of the air from the tire (release to the atmosphere).

An air pressure sensor disposed on the downstream side of the supply/discharge valve 11 is provided as a pressure detection portion.

When the aforementioned tire testing device 2 is used, the air pressure acting into the tire T can be adjusted to the test air pressure by the test pressure adjustment valve 10. Thus, tire testing can be performed with the constant test air pressure.

However, as described in the Problem that the Invention is to Solve, the pressure may decrease during the tire testing due to decrease of the air temperature in the tire T in spite of use of the aforementioned test pressure adjustment valve 10.

That is, when the compressed air at normal temperature flows into the tire T by the bead air pressure, the air originally existing in the tire T is compressed so that the temperature rises due to adiabatic compression. Thus, the air in the tire T reaches a high temperature. After that, in a process of moving from the bead air pressure to the test air pressure, the pressure of the air in the tire T decreases suddenly so that the temperature of the air in the tire T decreases due to adiabatic expansion. However, the amount of the temperature increase when the compressed air flows into the tire T is larger than the amount of temperature decrease in the process of moving to the test air pressure. Thus, the final temperature of the air in the tire T is higher than the temperature of the tire T or the rims, which is generally a normal temperature. As a result, there also appears a very small change in the air pressure inside the tire T.

Such a very small change in the air pressure inside the tire T is small to be 0.5 kPa to 1 kPa. It is difficult to adjust the very small change using the test pressure adjustment valve whose pressure adjustment accuracy is only ±0.1% (for example, about 1 kPa in a case of a pressure regulator having a rated adjustable pressure of 1,000 kPa).

Therefore, in the tire air filling mechanism 1 according to the invention, the air is supplied into the tire 1 so as to be turned therein. Thus, the thermal transfer efficiency between the inner surface of the tire T and the air is increased to promote thermal movement from the air in the tire T to the tire T or the rims, so that the temperature of the air in the tire T can be made close to the normal temperature as quickly as possible.

Next, the tire air filling mechanism 1 provided in the tire testing device 2 according to the invention will be described in detail.

Figure 3A:
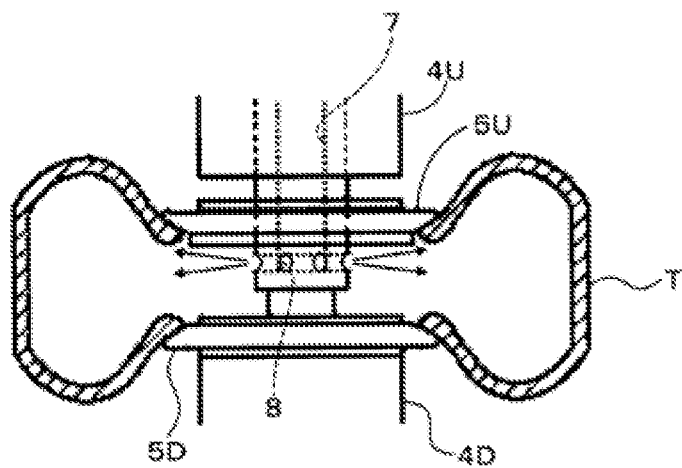
FIG. 3A is an enlarged view illustrating the tire air filling mechanism according to the first embodiment.
Figure 3B:
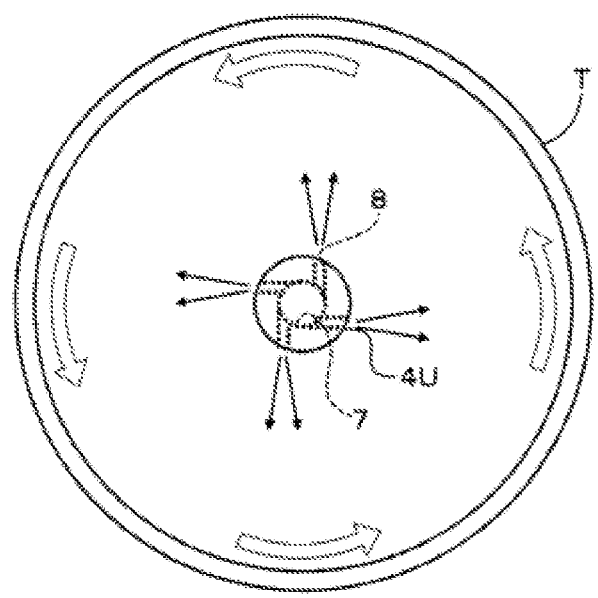
FIG. 3B is a view illustrating an injection direction of air in the tire air filling mechanism according to the first embodiment, and a turning state of the air inside a tire.

As illustrated in FIG. 3A and FIG. 3B, in the tire air filling mechanism 1 according to the first embodiment, the air injection ports 8 for injecting the air supplied into the tire T from the air supply source 6 are formed in a tire shaft.

Specifically, inside the tire shaft 4U, the air supply flow path 7 extending in the up/down direction along the axis of the tire shaft 4U is formed. On the lower end side corresponding to the tire T in the air supply flow path 7, the air injection ports 8 for injecting the compressed air into the tire T are formed to face horizontally.

The air injection ports 8 are formed at a plurality of places (four in the illustrated example) around the axis of the tire shaft 4U, so that the compressed air can be injected into the tire T through the individual air injection ports 8. In the tire air filling mechanism 1 according to the first embodiment, each air injection port 8 is formed in the pipe wall of the air supply flow path 7 so as to extend along the tangent direction of the pipe wall. That is, when viewed from one point (the place where the air is blown out) on the inner circumferential surface of the tire T, the air from the air injection port 8 seems to be injected not from the axis of the tire shaft 4U but from a position slightly shifted from the axis of the tire shaft 4U correspondingly to the flow path diameter of the air supply flow path 7. Accordingly, the injection direction of the air injected from the air injection port 8 in the first embodiment is inclined with respect to the radial direction.

When the air inside the tire T is turned thus, a relative velocity occurs between the inner surface of the tire T which is stopping, and the air which is injected from each air injection port 8. As a result, the thermal transfer efficiency from the supplied air to the tire T or the rims can be increased. That is, when the air in the tire T stands still, the thermal transfer efficiency is 4 kcal/(m$^2$·h·° C.). On the other hand, when the air in the tire T is flowing, the thermal transfer efficiency is largely improved to be 10 to 250 kcal/(m$^2$·h·° C.).

Therefore, the air supplied into the tire T reaches a high temperature in the process where the air is adiabatically compressed to the bead seat pressure, but the heat of the air is thermally transferred to the tire T or the rims. Thus, the temperature of the air decreases. The tire T itself or the rims themselves have a large thermal capacity. Thus, the amount of temperature increase in the tire T or the rims is slight. When a turning flow is applied to the air, the flow velocity of the air is higher particularly on a back surface of a tire tread far from the center. Thus, the thermal transfer efficiency of the air increases at the place with the higher flow velocity. As a result, temperature decreases more greatly than when the tire air is not turned as in the background art. In the process of moving from the bead seat pressure to the test pressure, the aforementioned air injection ports 8 serve as ports for discharging the air. Thus, the air in the tire T is not turned. Due to adiabatic expansion caused by sudden discharge of the air, the air temperature inside the tire T decreases. On this occasion, when the aforementioned thermal transfer efficiency is low, thermal transfer from the air in the tire T to the tire T or the rims is not promoted sufficiently. Thus, the temperature of the air in the tire T is kept high. However, when the aforementioned turning flow can be generated to promote the thermal transfer to the tire T, the temperature in the tire can be made close to the normal temperature. Thus, the change in the tire temperature during testing and the change in pressure corresponding thereto can be reduced in comparison with those in the background art.

Figure 6:
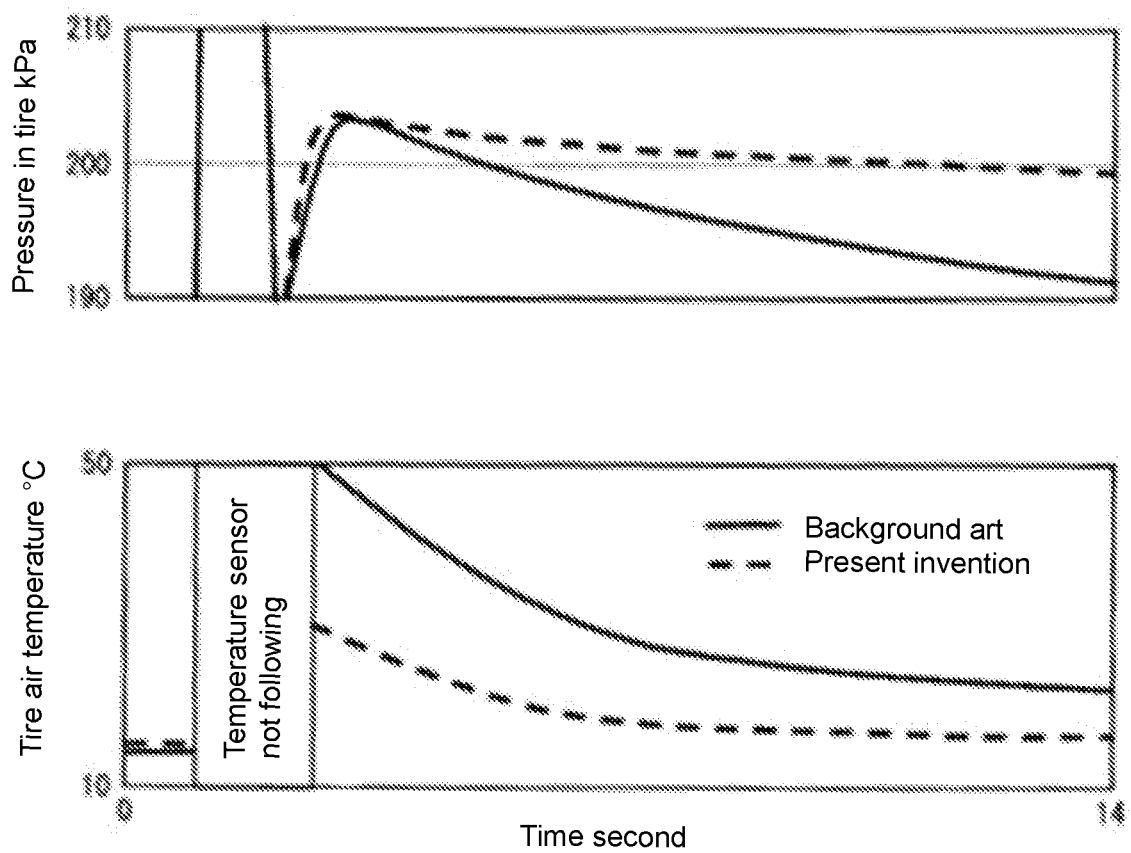
FIG. 6 is a chart showing a change of air pressure inside a tire and a change of air temperature inside the tire.
Figure 7A:
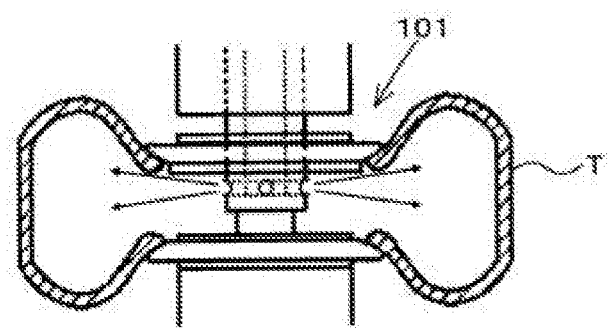
FIG. 7A is a view illustrating a configuration of a tire air filling mechanism according to a background-art example.
Figure 7B:
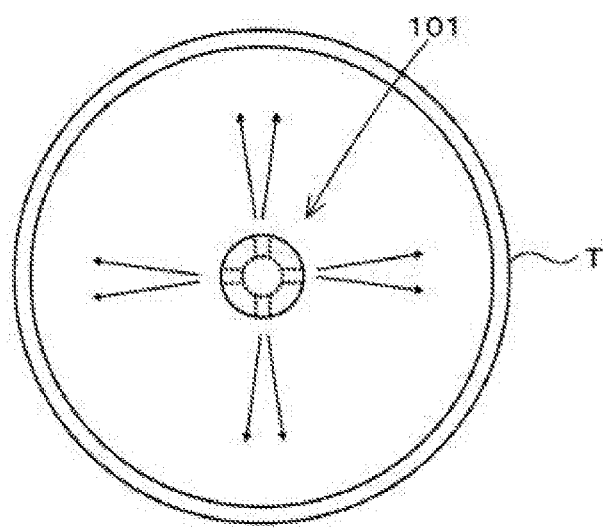
FIG. 7B is a view illustrating a configuration of a tire air filling mechanism according to a background-art example.

For example, as illustrated in FIG. 6, the change in the air pressure and the change in the air temperature inside the tire T which has been filled with the air can be compared between the tire air filling mechanism 1 according to the first embodiment and a background-art tire air filling mechanism shown in FIG. 7A and FIG. 7B.

FIG. 6 shows how the pressure and the temperature in the tire T changed when the air pressure in the tire T was increased to the bead seat pressure and the air was then discharged to reduce the air pressure to the test pressure (200 kPa). On this occasion, in order to make the relationship between the change of the temperature and the change of the pressure understood easily, the aforementioned shut-off valve 13 was closed to prevent the pressure adjustment valve 10 from operating immediately after the air pressure was moved to the test pressure.

As is apparent from FIG. 6, according to the embodiment, a turning flow is applied to the air in the tire T when the pressure of the air is increased to the bead seat pressure. Thus, thermal transfer from the air in the tire T, whose temperature has been increased due to adiabatic compression, to the tire T or the rims is sufficiently promoted so that the air in the tire T is made lower than in the background art when the air is discharged. It is therefore possible to reduce the temperature difference between the air temperature and the temperature of the tire T or the rims which is substantially equal to the room temperature. As a result, the change of pressure in the tire T set at a pressure around the test pressure (200 kPa) can be reduced.

That is, in the tire air filling mechanism 1 according to the first embodiment, it is understood that the temperature rise of the air in the tire T can be suppressed to suppress fluctuation of the air pressure generated during tire testing, as compared with that in a background-art tire air filling mechanism 101. Since the pressure adjustment valve 10 is operated in actual operation, the pressure change in each of the background art and the present invention is smaller than the result of FIG. 6. It has been, however, confirmed that the pressure change in the present invention is smaller than that in the background art. Therefore, in the tire air filling mechanism 1 according to the first embodiment, it is possible to measure tire uniformity at lower cost and with higher accuracy.

In order to intend to generate a turning flow more effectively in the aforementioned tire air filling mechanism 1 according to the first embodiment, a fin body twisted spirally may be provided inside the air supply flow path 7 (particularly near the air injections ports 8). For example, a rectangular plate body longer in the up/down direction may be twisted around the axis of the tire shaft 4U, and used as the fin body. When such a fin body is provided inside the air supply flow path, the air moves while turning spirally inside the air supply flow path 7. The turning air flows into the air injection ports 8 as keeping its turning force. Thus, a stronger turning flow can be generated due to the flow of the air injected from the air injection ports 8. It is a matter of course that the twisting direction of the aforementioned fin body should be made to coincide with the turning direction of the air in the tire T.

Second Embodiment

Next, a tire air filling mechanism 1 according to a second embodiment will be described with reference to the drawings.

Figure 4A:
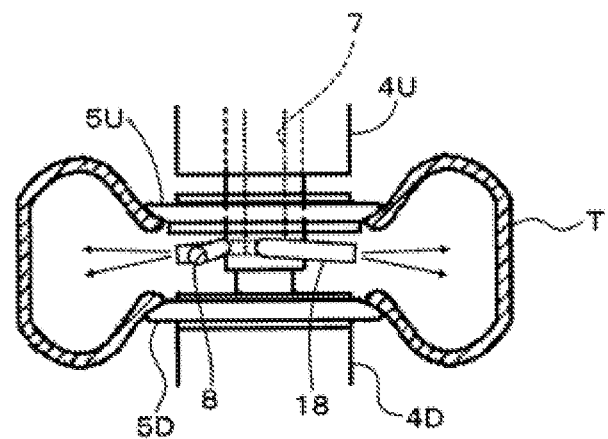
FIG. 4A is an enlarged view illustrating a tire air filling mechanism according to a second embodiment.
Figure 4B:
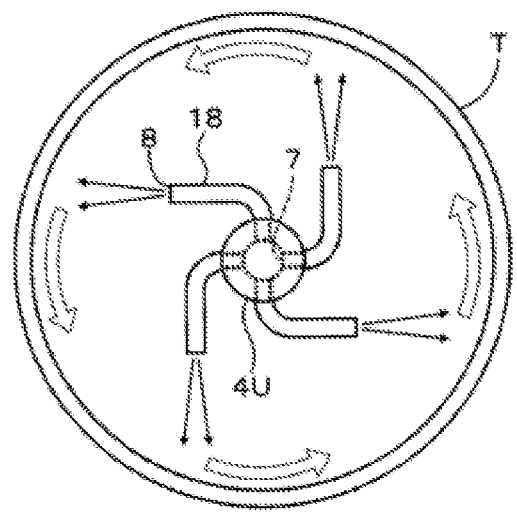
FIG. 4B is a view illustrating an injection direction of air in the tire air filling mechanism according to the second embodiment, and a turning state of the air inside a tire.

As illustrated in FIG. 4A and FIG. 4B, the tire air filling mechanism 1 according to the second embodiment is provided with tube members 18 which are curved so that the injection direction of the air injected in a radial direction from each air injection port 8 can be changed to a direction inclined with respect to the radial direction.

Specifically, each tube member 18 is a hollow member (tube) extending from the aforementioned air supply flow path 7 to the radially outside. The air can be circulated inside the tube member 18. An inner circumferential side end portion of the tube member 18 is coupled with the tire shaft 4U so that the air can be introduced from the air supply flow path 7. An outer circumferential side end portion of the tube member 18 is located on the inner circumferential side of the rim 5U so that the tube member 18 can be prevented from interfering with attachment/detachment of the tire T to/from the rim 5U. The longitudinally middle of each tube member 18 is curved along a horizontal direction. The tube members 18 have the same curving angle. In addition, the tube members 18 have the same curving direction.

That is, also in each tube member 18 according to the second embodiment, the injection direction of the air viewed from the inner circumferential surface of the tire T is offset from the axis of the tire shaft 4U correspondingly to the length of the tube member 18, so that the injection direction of the air can be changed to a direction inclined with respect to a radial direction (a direction connecting the corresponding air injection port 8 with a point on the inner circumferential surface of the tire T to which the air is injected). Therefore, also in the tire air filling mechanism 1 according to the second embodiment, the air can be turned inside the tire T to thereby generate a relative velocity between the inner surface of the tire T and the air. Thus, it is possible to enhance the thermal transfer efficiency of the air in comparison with that when the air stands still.

Third Embodiment

Next, a tire air filling mechanism 1 according to a third embodiment will be described with reference to the drawings.

Figure 5A:
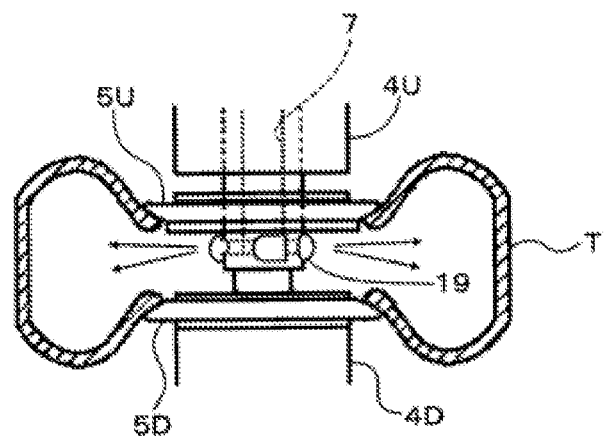
FIG. 5A is an enlarged view illustrating a tire air filling mechanism according to a third embodiment.
Figure 5B:
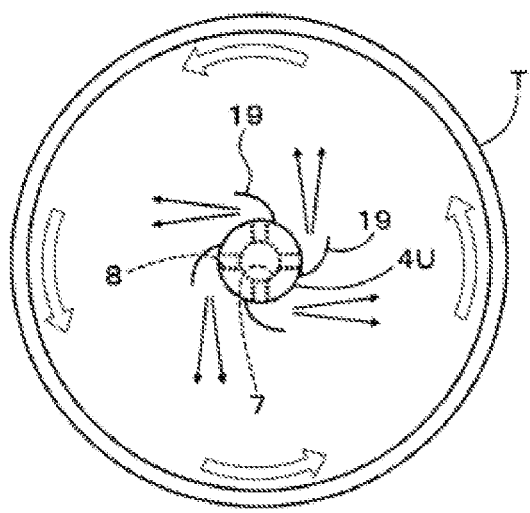
FIG. 5B is a view illustrating an injection direction of air in the tire air filling mechanism according to the third embodiment, and a turning state of the air inside a tire.

As illustrated in FIG. 5A and FIG. 5B, the tire air filling mechanism 1 according to the third embodiment is provided with direction-changing plates 19 by which the injection direction of the air injected in a radial direction from each air injection port 8 can be changed to a direction inclined with respect to the radial direction.

Specifically, in the tire shaft 4U where the tire air filling mechanism 1 according to the third embodiment is provided, air injection ports 8 are formed along a radial direction of the tire shaft 4U in the same manner as in the other embodiments. The air is injected in the radial direction from the air injection ports 8. However, in the tire air filling mechanism 1 according to the third embodiment, the direction-changing plates 19 are provided on the radially outside of the air injection ports 8 so that the flow of the air injected along the radial direction can be changed halfway. It is therefore possible to change the injection direction of the air to a direction inclined with respect to the radial direction.

That is, the direction-changing plates 19 are members which are attached to the outer circumferential surface of the tire shaft 4U where the air injection ports 8 are formed, so that the outer circumferential surface of the tire shaft 4U can be covered with the direction-changing plates 19 while the direction-changing plates 19b are opened in one circumferential direction. The direction-changing plates 19 provided for the air injection ports 8 respectively are disposed so that their opening directions are justified. Thus, a turning flow can be formed in the air inside the tire T in the same manner as in the other embodiments.

Therefore, also in the tire air filling mechanism 1 according to the third embodiment, the air can be turned inside the tire T to thereby generate a relative velocity between the inner surface of the tire T and the air. It is therefore possible to enhance the thermal transfer efficiency of the air in comparison with that when the air stands still.

The embodiments disclosed here should be considered not as restrictive but as exemplary at any point. Particularly, as items not disclosed clearly in the embodiments disclosed here, such as running conditions or operating conditions, various parameters, dimensions, weights and volumes of constituents, etc., values which can be estimated easily by those typically skilled in the art without departing from the scope where they carry out typically are used.

Although the aforementioned embodiments have been described using a tire uniformity device as the tire testing device 2, the tire air filling mechanism 1 according to the invention can be applied to a tire testing machine of another type, such as a tire balancer, a rolling resistance testing machine, a travel tester, a flat belt tester, etc.

The present application is based on a Japanese patent application No. 2016-019167 filed on Feb. 3, 2016, the contents of which are incorporated here by reference.

DESCRIPTION OF REFERENCE NUMERALS AND SIGNS

1 tire air filling mechanism
2 tire testing device
3 frame
4U upper tire shaft
4D lower tire shaft
5U upper rim
5D lower rim
T tire
6 air supply source
7 air supply flow path
8 air injection port
9 air pressure circuit
9*b* bead seat system
9*t* test system
10 pressure adjustment valve (test pressure adjustment valve)
11 supply/discharge valve
12 changeover valve
13 shut-off valve
14 pressure detection portion
15 bead pressure adjustment valve
16 air filter
17 pressure gauge
18 tube member
19 direction-changing plate

The invention claimed is:

1. A tire air filling mechanism in a tire testing device, comprising an air supply source which supplies air into a tire to be mounted between a pair of rims attached to ends of tire shafts,
wherein a line extending along an injection direction of the air supplied into the tire from the air supply source is offset from a center axis of the tire, so that the air supplied from the air supply source is rotated in a circumferential direction inside the tire.

2. The tire air filling mechanism in a tire testing device according to claim 1,
wherein an air injection port from which the air supplied into the tire from the air supply source is injected is formed in one of the tire shafts, and the air injection port is formed in a direction inclined with respect to the radial direction.

3. The tire air filling mechanism in a tire testing device according to claim 2,
wherein a curved tube member is provided so that the line extending along the injection direction of the air injected in the radial direction from the air injection port is changed to a direction offset from the center axis of the tire.

4. The tire air filling mechanism in a tire testing device according to claim 2,
wherein a direction-changing plate is provided so that the line extending along the injection direction of the air injected in the radial direction from the air injection port is changed to a direction offset from the center axis of the tire.

5. The tire air filling mechanism in a tire testing device according to claim 3,
wherein a direction-changing plate is provided so that the line extending along the injection direction of the air injected in the radial direction from the air injection port is changed to a direction offset from the center axis of the tire.

6. A tire air filling method in a tire testing device,
in which the tire air filling mechanism according to claim 1 is used to inject the air supplied from the air supply source in a direction offset from the center axis of the tire so that the air is supplied into the tire while being rotated in a circumferential direction inside the tire.

* * * * *